United States Patent
Vovnoboy et al.

(10) Patent No.: US 9,847,937 B2
(45) Date of Patent: Dec. 19, 2017

(54) HARDWARE ACCELERATION FOR ROUTING PROGRAMS

(71) Applicant: Marvell World Trade Ltd., St. Michael (BB)

(72) Inventors: Vitaly Vovnoboy, Karney Shomton (IL); Gad Hutt, Sunnyvale, CA (US); Ronen Tausi, Raanana (IL); Adi Sapir, Hod Hasharon (IL); Michael Orr, Sunnyvale, CA (US); Victor Ryabchin, Azur (IL)

(73) Assignee: Marvell World Trade Ltd., St. Michael (BB)

( * ) Notice: Subject to any disclaimer, the term of this patent is extended or adjusted under 35 U.S.C. 154(b) by 257 days.

(21) Appl. No.: 14/223,795

(22) Filed: Mar. 24, 2014

(65) Prior Publication Data
US 2014/0286339 A1 Sep. 25, 2014

Related U.S. Application Data

(60) Provisional application No. 61/804,924, filed on Mar. 25, 2013.

(51) Int. Cl.
*H04L 12/24* (2006.01)
*H04L 12/721* (2013.01)
(Continued)

(52) U.S. Cl.
CPC ........ *H04L 45/566* (2013.01); *H04L 41/0813* (2013.01); *H04L 45/54* (2013.01); *H04L 45/56* (2013.01); *H04L 45/60* (2013.01)

(58) Field of Classification Search
None
See application file for complete search history.

(56) References Cited

U.S. PATENT DOCUMENTS

5,444,642 A * 8/1995 Montgomery ........ G06F 15/177
702/91
6,985,454 B1 * 1/2006 Wiedeman ......... H04B 7/18589
370/316

(Continued)

FOREIGN PATENT DOCUMENTS

EP 1511238 3/2005
WO WO-2014160652 10/2014

OTHER PUBLICATIONS

"International Search Report and Written Opinion", Application No. PCT/US2014/031618, dated Aug. 13, 2014, 10 Pages.

*Primary Examiner* — Jeffrey M Rutkowski
*Assistant Examiner* — Jonathan B Wood

(57) ABSTRACT

The present disclosure describes techniques for hardware acceleration for routing programs. In some aspects communications between a routing determination program and a packet router are monitored in a router, both the routing determination program and the packet router being part of a software layer of the router. The communications include the routing determination program providing configuration data to the packet router. Based on the monitored communications, a packet processor is changed to reflect the configuration data, the packet processor being part of a hardware layer of the router. The packet processor performs packet routing operations of receiving packets, determining the next routers in the paths to the target destinations of the packets, and sending the packets to the next routers independent of the software layer.

20 Claims, 5 Drawing Sheets

(51) Int. Cl.
*H04L 12/771* (2013.01)
*H04L 12/741* (2013.01)
*H04L 12/773* (2013.01)

(56) References Cited

U.S. PATENT DOCUMENTS

| | | | | |
|---|---|---|---|---|
| 7,245,619 B1* | 7/2007 | Guan | ...................... | H04L 45/02 370/389 |
| 7,415,028 B1* | 8/2008 | Allam | ................... | H04L 61/103 370/395.54 |
| 7,720,061 B1* | 5/2010 | Krishnaswamy | ....... | H04L 45/00 370/389 |
| 7,773,630 B2* | 8/2010 | Huang | ................... | H04L 47/10 370/474 |
| 8,149,713 B2* | 4/2012 | Sun | ......................... | H04L 45/00 370/237 |
| 8,180,891 B1* | 5/2012 | Harrison | ................. | H04L 63/10 709/224 |
| 8,472,324 B1* | 6/2013 | Richardson | ............. | H04L 45/42 370/235 |
| 8,570,331 B1* | 10/2013 | Wyatt | ................... | G06F 1/3206 345/501 |
| 8,619,780 B1* | 12/2013 | Brandwine | ............. | H04L 45/02 370/392 |
| 8,644,339 B1* | 2/2014 | Krishna | ............... | H04W 28/065 370/471 |
| 8,830,841 B1* | 9/2014 | Mizrahi | ................. | H04L 41/00 370/230.1 |
| 9,027,129 B1* | 5/2015 | Kancherla | ........... | H04L 63/1458 726/22 |
| 9,154,449 B2* | 10/2015 | Qiu | ........................ | H04L 49/355 |
| 9,602,421 B2* | 3/2017 | Koponen | ............. | G06F 9/45558 |
| 2003/0107994 A1* | 6/2003 | Jacobs | .................... | H04L 47/10 370/235 |
| 2005/0270986 A1* | 12/2005 | Watanabe | ............... | H04L 41/12 370/252 |
| 2008/0126812 A1* | 5/2008 | Ahmed | .................. | H04N 19/61 713/189 |
| 2010/0061235 A1* | 3/2010 | Pai | ....................... | H04L 12/2801 370/230.1 |
| 2010/0260192 A1* | 10/2010 | Hiie | ....................... | H04L 45/00 370/400 |
| 2011/0075680 A1 | 3/2011 | Sun et al. | | |
| 2011/0122889 A1* | 5/2011 | Pacella | ................... | H04L 45/54 370/428 |
| 2011/0141942 A1* | 6/2011 | Qiu | ..................... | H04L 41/0816 370/254 |
| 2012/0102564 A1* | 4/2012 | Schentrup | ........... | G06F 21/6218 726/16 |
| 2012/0281560 A1* | 11/2012 | Zourzouvillys | ........ | H04L 45/00 370/252 |
| 2014/0029617 A1* | 1/2014 | Wang | ..................... | H04L 45/38 370/392 |
| 2014/0071984 A1* | 3/2014 | Morgan | ............. | H04L 43/0888 370/389 |
| 2014/0122727 A1* | 5/2014 | Miner | ..................... | H04L 67/12 709/227 |
| 2014/0321462 A1* | 10/2014 | Kancherla | ............... | H04L 45/72 370/389 |
| 2015/0280765 A1* | 10/2015 | Lowery | .................. | H04W 8/22 455/558 |

* cited by examiner

HARDWARE ACCELERATION FOR ROUTING PROGRAMS

CROSS-REFERENCE TO RELATED APPLICATION

This present disclosure claims priority to U.S. Provisional Patent Application Ser. No. 61/804,924 filed Mar. 25, 2013, the disclosure of which is incorporated by reference herein in its entirety.

BACKGROUND

As computing devices have become increasingly available and part of our everyday lives, it has become important for people to be able to interconnect some of these devices. Computing devices can be interconnected using a network, which allows data to be communicated between two devices by way of one or more intermediary devices referred to as routers. A router is a device that receives data from one device and sends the received data to another device (e.g., another router) based on a target destination of the data. The data is typically received and sent in the form of packets of data. While current routers are useful, they are not without their problems. One such problem is that it remains difficult to build routers that are relatively inexpensive, are easily changeable by users, and route data quickly. This can lead to frustration for the user of the router and a poor user experience with the router.

SUMMARY

This summary is provided to introduce subject matter that is further described below in the Detailed Description and Drawings. Accordingly, this Summary should not be considered to describe essential features nor used to limit the scope of the claimed subject matter.

In general, in one aspect, this specification describes a method that includes monitoring, in a router having a hardware layer and a software layer, communications between a routing determination program and a packet router. The routing determination program identifies one or more paths to each of multiple possible target destinations for packets in a network, and the packet router maintains a forwarding information base identifying selected ones of the one or more paths. The communications include the routing determination program providing to the packet router configuration data that identifies the selected ones of the one or more paths, and the routing determination program and the packet router are both part of a software layer of the router. The method also includes changing, based on the monitored communications, a packet processor to reflect the configuration data, the packet processor being part of a hardware layer of the router.

In general, in another aspect, this specification describes a router that includes a packet processor implemented in a hardware layer of the router, and one or more programs implemented in a software layer of the router. The one or more programs are configured to monitor communications between a routing determination program and a packet router, the communications including the routing determination program providing configuration data to the packet router. The routing determination program and the packet router are both part of the software layer of the router. The one or more programs are further configured to change, based on the monitored communications, the packet processor to reflect the configuration data.

In general, in another aspect, this specification describes a computer-readable memory device comprising computer-executable instructions that, when executed, implement a router to monitor, in the router, communications between a routing determination program and a packet router. The communications include the routing determination program providing configuration data to the packet router, and the routing determination program and the packet router are both part of a software layer of the router. The router is also to change, based on the monitored communications, a packet processor to reflect the configuration data, the packet processor being part of a hardware layer of the router.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Methods and apparatus for hardware acceleration for routing programs are discussed herein. Generally, a router operates on packets of data it receives, oftentimes receiving packets from one router and sending the received packets to another router to progress the packets towards their target destination. The router includes a software layer and a hardware layer. The software layer includes a user space implementing both a routing determination program and a call monitoring program, and a kernel space that implements a packet router. The routing determination program determines paths for packets the router may receive based on possible target destinations for packets, generates records that include the determined paths, and communicates selected ones of the determined paths to the packet router as configuration data for the packet router. The call monitoring program monitors this communication of the selected paths to the packet router, identifies the selected paths in the communication, and has the selected paths reflected in a packet processor implemented in the hardware layer. The call monitoring program provides the selected paths to the packet processor itself, or alternatively provides the selected paths via a hardware configuration program implemented in the user space. Other configuration data can also be provided to the packet router, such as data identifying packets that are to be provided to a program of the software layer rather than being sent to another router. This configuration data is similarly monitored by the call monitoring program, and reflected in the packet processor.

Having the configuration data reflected in the packet processor allows many operations of the router to be performed in the hardware layer rather than the software layer. For example, in response to receipt of a packet the packet processor can use the configuration data to determine the router that the packet is to be sent to, and send the packet to that router without involving the software layer. This increases the speed at which packets can be received, a next router identified based on the target destination, and the packet sent to the next router (e.g., because these actions can typically be performed faster by hardware than by software). This also frees a central processing unit of the router to perform operations other than routing packets.

Figure 1:
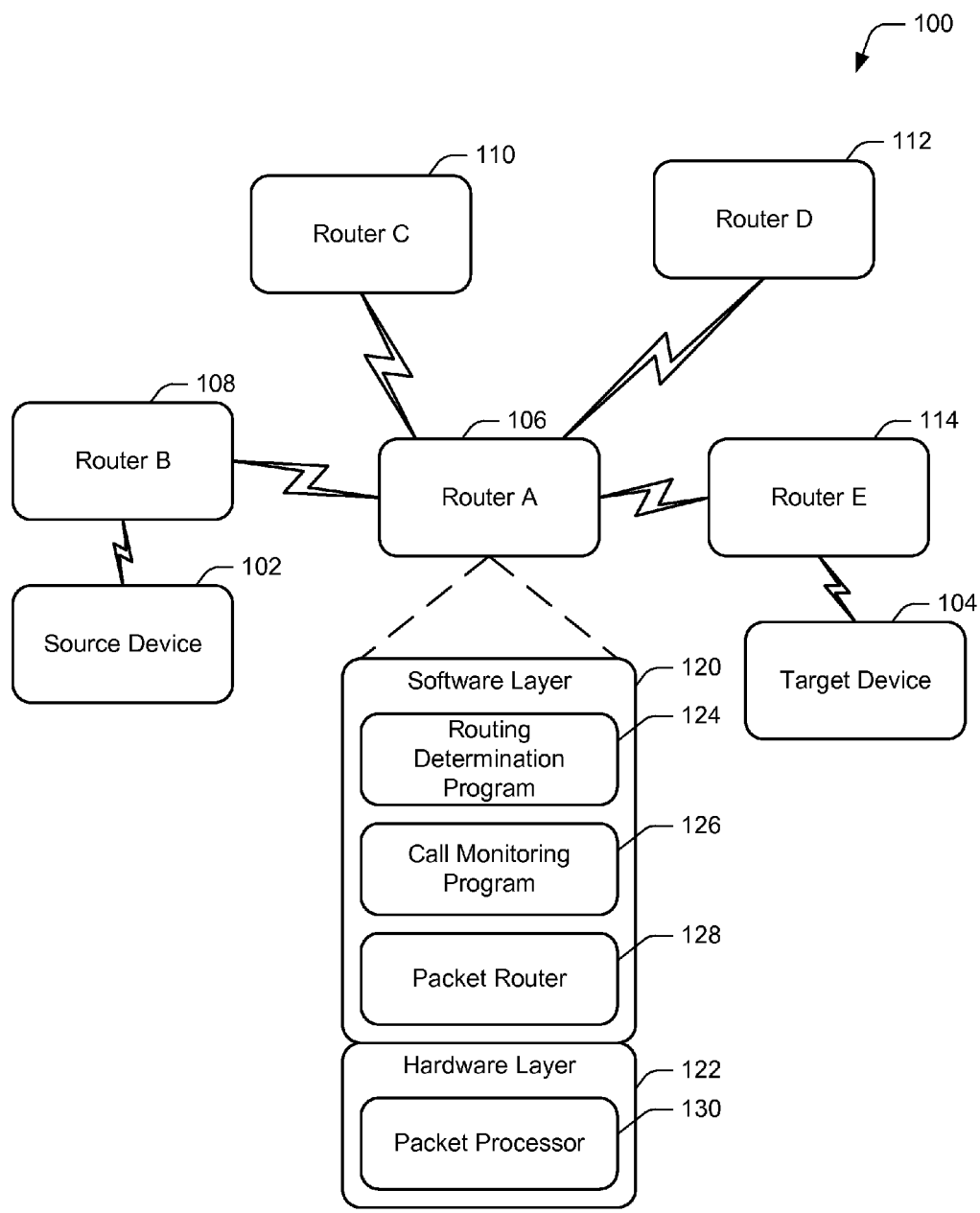
FIG. 1 illustrates an example network in which the methods and apparatus for hardware acceleration for routing programs can be used in accordance with one or more embodiments.

FIG. 1 illustrates an example network 100 in which the methods and apparatus for hardware acceleration for routing programs can be used in accordance with one or more embodiments. The network 100 allows data to be passed from a source device 102 to a target device 104 through one or more routers, such as routers 106, 108, 110, 112, and 114. To send data from the source device 102 to the target device 104, the source device puts the data in a data structure referred to as a packet. The packet includes the data being sent, as well as various header information that describes the packet, describes the data, and so forth. The source device 102 also associates with the packet information identifying the target device 104, such as by including an identifier of the target device 104 in the header of the packet. The target device 104 is also referred to as the target destination for the packet. The source device 102 provides the packet to a router of the network 100 (or alternatively the source device 102 is a router of the network 100), and that router both determines the next router of the network 100 in a path to the target device 104 and sends the packet to that determined next router. This process continues, with each router that receives the packet determining a next router in a path to the target device 104, and each router sending the packet to the determined next router in a path to the target device 104, until the packet reaches the target device 104. The target device 104 is coupled to (or alternatively is) a router of the network 100. Although a single source device 102, a single target device 104, and five routers 106-114 are illustrated, it should be noted that the network 100 can include any number of source devices, any number of target devices, and any number of routers.

By way of example, the source device 102 is coupled to and provides a packet to the router 108. The router 108 determines that the router 106 is the next router in a path to the target device 104, and sends the packet to the router 106. The router 106 determines that the router 114 is the next router in a path to the target device 104, and sends the packet to the router 114, which is coupled to and provides the packet to the target device 104. It should be noted that this is a specific example, and that the packet can pass through any number of routers when traveling from the source device 102 to the target device 104.

It should also be noted that each of the routers 106-114 knows or is configured with a path (or at least a next router in a path) to the target device 104, but different routers 106-114 may know or be configured with different paths to the target device 104. For example, the router 108 may know a path to the target device 104 that passes from the router 108 to the router 110 to the router 112 to the router 114, whereas the router 110 may know a path to the target device 104 that passes from the router 110 to the router 106 to the router 114.

It should further be noted that each of the routers 106-114 can know or be configured with a full path to the target device 104, or alternatively with a next router in a path to the target device. Each router 106-114 thus need not know all paths through the network 100. Rather, each router 106-114 can simply know or be configured with a next router in a path to each of multiple target devices.

The router 106 implements the hardware acceleration for routing programs techniques discussed herein. In one or more embodiments other routers 108-114 also implement the hardware acceleration for routing programs techniques discussed herein, although alternatively one or more of the routers 108-114 do not implement the hardware acceleration for routing programs techniques discussed herein. The router 106 includes both a software layer 120 and a hardware layer 122. The software layer 120 includes a routing determination program 124, a call monitoring program 126, and a packet router 128. The software layer 120 refers to programs or modules that are implemented as instructions to be executed or otherwise processed by a central processing unit (CPU) or other processor of the router 106 to carry out the functionality of the programs or modules. The software layer 120 includes programs or modules in software, firmware, or combinations thereof. The hardware layer 122 includes a packet processor 130. The hardware layer 122 refers to physical components that carry out particular functionality, such as analog or digital circuits, logic components, wires or other connectors, registers, and so forth.

Generally, the routing determination program 124 identifies and maintains a record of one or more paths to each of multiple possible target destinations for packets. The target destination for a packet refers to the target device to which the packet is being sent. These one or more paths are also referred to as routing information bases (RIBs). From these one or more paths, the routing determination program 124 selects and maintains a record of one path for each of the multiple possible target destinations. The collection of selected paths is also referred to as a forwarding information base (FIB). The routing determination program 124 communicates the FIB to the packet router 128. The call monitoring program 126 monitors this communication, and has the FIB reflected in (stored in a manner usable by) the packet processor 130. The packet processor 130 uses the FIB to determine a next router to send received packets to, based on the target destinations of the packets. The routing determination program 124 and the packet router 128 need have no knowledge of, and typically have no knowledge of, the call monitoring program 126.

In one or more embodiments, additional configuration data is similarly provided to the packet router 128 by the routing determination program 124 or other program in the software layer 120. This additional configuration data identifies, for example, types of packets or target destinations that are to be provided to the routing determination program 124 or other program in the software layer 120, rules or criteria to determine which packets are to be provided to the routing determination program 124 or other program in the software layer 120, and so forth. This additional configuration data thus identifies packets that are to be provided to a program of the software layer 120 rather than sent to another router. The call monitoring program 126 monitors the communication of this additional configuration data to the packet router 128, and has this additional configuration data reflected in the packet processor 130. Thus, received packets to be provided to the routing determination program 124 or other program in the software layer 120 are provided to such program by the packet processor 130.

Figure 2:
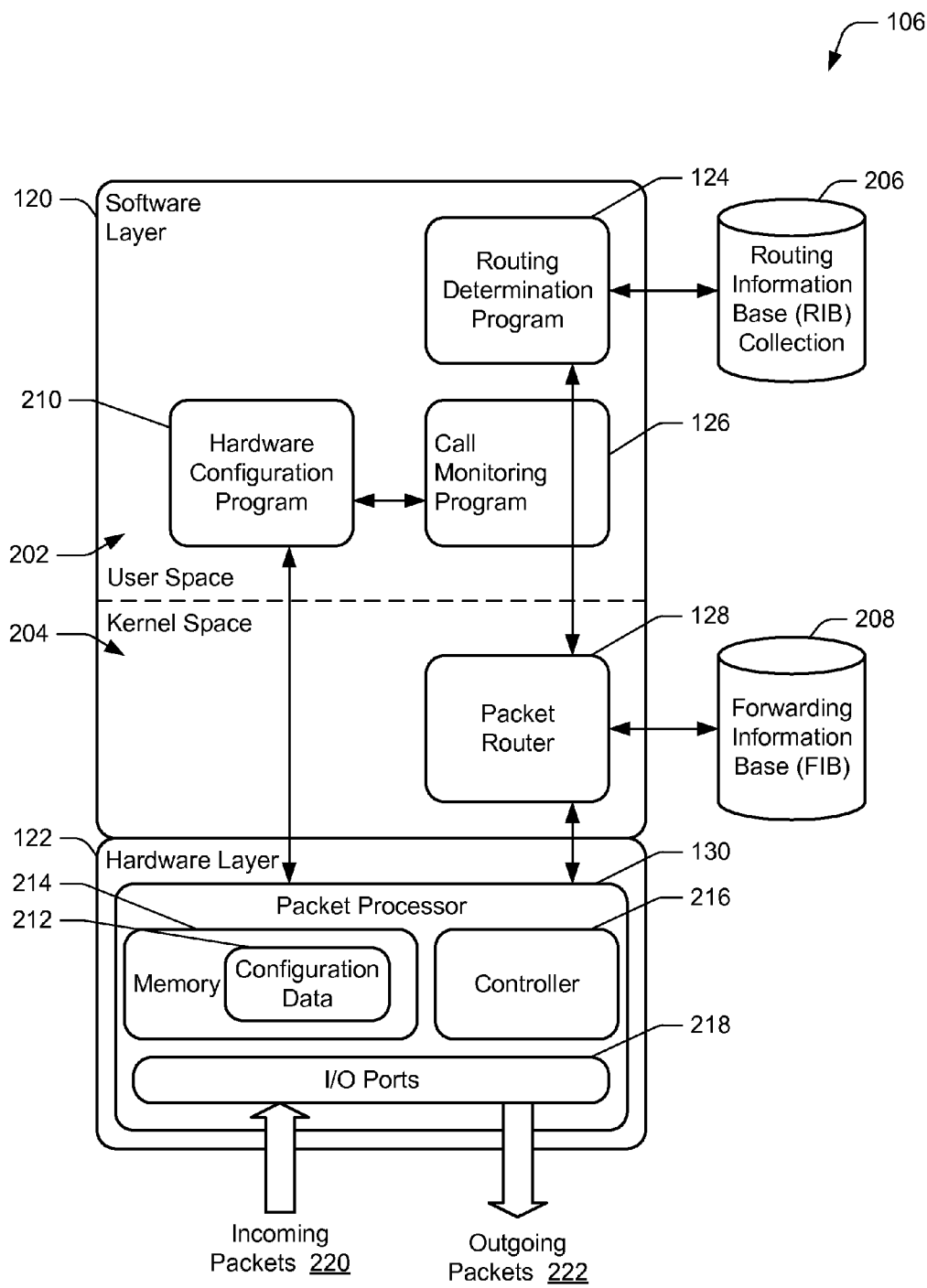
FIG. 2 illustrates a router in additional detail in accordance with one or more embodiments.

FIG. 2 illustrates the router 106 in additional detail in accordance with one or more embodiments. The router 106 includes the software layer 120 having a user space 202 and a kernel space 204. The router 106 is implemented on a computing device including a CPU, memory, and an operating system. In one or more embodiments the operating system is a Linux operating system, although various other operating systems can alternatively be used. The CPU and the operating system allow programs to be run in the user space 202 or the kernel space 204. The kernel space 204 includes programs of an operating system that manage hardware resources of the router 106, such as access to various input/output (I/O) hardware components, memory, and the CPU. The programs in the kernel space 204 also provide protection from malicious programs, allowing some protection regarding which other programs are permitted to access the hardware resources. Other programs in the user space 202 access the programs in the kernel space 204 to use these hardware resources. The operating system is made up of multiple programs, some of which are part of the user space 202. Other programs also operate in the user space 202, for example programs providing various services such as Web page hosting, email or messaging services, and so forth. The user space 202 and the kernel space 204 are implemented using any of a variety of public and/or proprietary techniques.

The routing determination program 124 identifies one or more paths to each of multiple possible target destinations for packets in the network. The path to a target destination identifies at least a next router in the path to the target destination, and optionally identifies two or more routers in the path to the target destination. The routing determination program 124 receives paths from various sources, such as a user of the router 106, other routers, and so forth. Various different protocols are used to describe the paths, such as open shortest path first (OSPF), routing information protocol (RIP), border gateway protocol (BGP), and so forth. Each path also has zero or more attributes (also referred to as metrics) that describe the path, such as the length of the path, the cost associated with using the path, a speed of the path, and so forth.

The one or more paths are also referred to as RIBs, and are maintained in an RIB collection 206. Each RIB is a collection of paths received from a particular source or that uses a particular protocol to describe paths. The RIB collection 206 is stored in memory of the router 106.

The routing determination program 124 selects, for each of multiple possible target destinations, one path from the RIB collection 206. The routing determination program 124 uses any of a variety of public and/or proprietary techniques to select paths from the RIB collection. For example, the routing determination program 124 may select paths based on one or more attributes of the paths, or alternatively other rules or criteria. The multiple target destinations are identified in any of a variety of different manners, such as being received from a user of the router 106, being received from another router, being inherent in the addressing protocol used to identify source devices and target devices, and so forth.

The collection of selected paths is also referred to as an FIB. For each target destination, a correspondence between the target destination and the selected path to that target destination is maintained by the FIB. This target destination and selected path data is used by the packet processor 130 to route packets to routers along the paths, as discussed in more detail below.

The routing determination program 124 communicates the FIB to the packet router 128, which maintains the FIB as FIB 208. The FIB 208 is stored in memory of the router 106. The routing determination program 124 communicates the FIB to the packet router 128 in a manner than can be monitored or snooped by the call monitoring program 126. In one or more embodiments, the routing determination program 124 communicates the FIB to the packet router 128 by invoking or calling an interface exposed by the packet router 128, as discussed in more detail below. The routing determination program 124 communicates the FIB to the packet router 128 as commands or calls to operate on particular paths (e.g., add a path to the FIB, remove a path from the FIB, change a path in the FIB, and so forth), or alternatively commands or calls to operate on multiple paths (e.g., remove a set of multiple paths from the FIB, add a set of multiple paths to the FIB, replace the entire FIB with a new FIB, and so forth).

The routing determination program 124 identifies paths to include in the RIB collection 206 at various times or in response to various events, such as in response to receipt of a path from another router or a user of the router 106. The routing determination program 124 also selects paths from the RIB at various times or in response to various events. For example, the routing determination program 124 may select paths to include in the FIB at regular or irregular intervals (e.g., hourly or daily), in response to receipt of a threshold number of new paths from other routers, and so forth. The routing determination program 124 communicates changes to the FIB at regular or irregular intervals. The paths in the RIB collection 206, as well as in the FIB, can thus change over time.

The packet router 128 is configured to pass packets between programs in the user space 202 and the hardware layer 122. Some packets received by the router 106 target the routing determination program 124, such as packets providing configuration information for the router 106, packets providing paths to the router 106, and so forth. The packet router 128 receives these packets from the hardware layer 122 and communicates the packets to the routing determination program 124. The packet router 128 communicates the packets to the routing determination program 124 in various manners, such as by invoking or calling an interface exposed by the routing determination program 124. The packet router 128 can also receive packets from the routing determination program 124 that are to be sent to another router (e.g., providing to another router an indication of paths known to the router 106). The routing determination program 124 communicates these packets to the packet router 128 in various manners, such as by invoking or calling an interface exposed by the packet router 128. The packet router 128 provides these packets to the hardware layer 122, which sends these packets to another router.

The packet router 128 is also configured to receive a packet (e.g., from another router), determine the next router to send the packet to based on both the target destination of the packet and the FIB 208, and send the packet to the determined next router. However, the packet router 128 does not perform these operations in the router 106. Rather, the packet processor 130 in the hardware layer 122 performs these operations, ignoring or bypassing the packet router 128, as discussed in more detail below.

The call monitoring program 126 monitors or snoops communications between the routing determination program 124 and the packet router 128. The call monitoring program 126 monitors communications in various manners, which vary by implementation and operating system. For example, the Linux operating system allows programs to monitor system calls, which include calls made to the packet router 128. The routing determination program 124 uses calls, which can be referred to as NETLINK_ROUTE sockets that are based on netlink messages, to communicate the FIB to the packet router 128. The call monitoring program 126 monitors these calls, and has the FIB that is included in these calls reflected in the packet processor 130.

In one or more embodiments, the call monitoring program 126 has the FIB reflected in the packet processor 130 by sending the FIB to a hardware configuration program 210, which in turn configures the packet processor 130 with the FIB. Configuring the packet processor 130 with the FIB refers to storing in memory of the packet processor 130 data indicating target destinations and the paths of the FIB to those target destinations in a manner that makes the stored data useable by the packet processor 130 to route packets along the paths of the FIB.

In embodiments in which the call monitoring program sends the FIB to the hardware configuration program 210, the hardware configuration program 210 receives data monitored by the call monitoring program 126, including the FIB, and configures the packet processor 130 with the received data. The hardware configuration program 210 configures the packet processor 130 directly storing the target destination and path data from the FIB as configuration data 212 in memory 214 of the packet processor 130 (e.g., by performing register writes to the packet processor 130). Alternatively, the hardware configuration program 210 configures the packet processor 130 by communicating with a device driver (not shown) associated with the packet processor 130. The device driver is implemented in the kernel space 204 (or alternatively the user space 202), and receives from the hardware configuration program 210 the data with which the packet processor 130 is to be configured, and stores the data in memory of the packet processor 130 (e.g., by performing register writes). Use of the device driver allows the hardware configuration program 210 to operate in a more general manner, and rely on the device driver to know the appropriate memory where data is to be stored. For example, the hardware configuration program 210 can call an Add_route interface of the device driver and provide the target destination and path data as parameters. The device driver knows the locations in memory of the packet processor where the target destination and path data are to be stored. Different routers can thus use the same hardware configuration program 210, but have different packet processors 130.

In embodiments in which the call monitoring program 126 itself configures the packet processor 130 with the FIB, the call monitoring program 126 configures the packet processor 130 by storing the target destination and path data from the FIB as configuration data 212 in memory 214 of the packet processor 130, analogous to the operation of the hardware configuration program 210. Alternatively, the call monitoring program 126 can communicate with a device driver associated with the packet processor 130 to store the target destination and path data from the FIB as configuration data 212 in memory 214 of the packet processor 130, analogous to the operation of the hardware configuration program 210.

In the illustrated example of FIG. 2, the call monitoring program 126 and the hardware configuration program 210 are implemented in the user space 202. Alternatively one or both of the call monitoring program 126 and the hardware configuration program 210 are implemented in the kernel space 204.

In one or more embodiments, the packet processor 130 is implemented as a hardware switch. The packet processor 130 includes the memory 214, a controller 216, and multiple I/O ports 218. The FIB is reflected in the packet processor 130 by being stored as configuration data 212 (e.g., by the hardware configuration program 210). The I/O ports 218 can be any number of ports, such as 20, 50 or 100 ports. Each port of the I/O ports 218 receives and transmits packets of data. Incoming packets 220 are received by the I/O ports 218. For a received packet, the controller 216 performs packet routing operations including identifying the target destination for the packet (e.g., as indicated in a header of the packet), determining the next router in the path to the target destination based on the configuration data 212, and sending the packet to the next router as an outgoing packet 222. As the FIB is reflected in the packet processor 130 as the configuration data 212, given a target destination the selected path to that target destination is readily identified from the configuration data 212. Depending on the networking protocol being used, the packet routing operations optionally also include, prior to sending the packet to the next router, adding headers or rewriting headers of the packet so that the packet is correctly sent to the next router.

It should be noted that the packet processor 130 performs the packet routing operations of receiving packets, determining the next routers in the paths to the target destinations of the packets, and sending the packets to the next routers independent of the software layer 120. The packet processor 130 performs these packet routing operations ignoring the packet router 128—the packet router 128 need have no knowledge of, and typically has no knowledge of, the packets that are received and sent by the packet processor 130.

It should also be noted that the packet processor 130 differs from a network interface card. The packet processor 130 includes multiple ports, typically at least 20-30, in contrast to the single port of a network interface card. The packet processor 130 also uses the configuration data 212 to perform the packet routing operations, in contrast to network interface cards which include no such capability.

The call monitoring program 126 also monitors or snoops communication of configuration data other than the FIB between the routing determination program 124 and the packet router 128. For example, in the Linux operating system the routing determination program 124 uses calls (referred to as NetDev calls) to communicate this configuration data to the packet router 128. Any configuration data that can be communicated between the routing determination program 124 and the packet router 128 indicating the manner in which the packet router 128 is to operate can be monitored by the call monitoring program 126, which can have the configuration data reflected in the packet processor 130. This configuration data includes, for example, indications of packets that are to be provided to the routing determination program 124, such as packets providing configuration information for the router 106, packets providing paths to the router 106, and so forth. Packets to be provided to the routing determination program 124 can be identified in different manners, such as packets that have the router 106 as a target destination, packets that are identified (e.g., in a header) as being configuration or control packets, or using various other rules or criteria.

The call monitoring program 126 has the monitored configuration data reflected in the packet processor 130, such as being written as configuration data 212 by the hardware configuration program 210. Incoming packets 220 that are to be provided to the routing determination program 124 can thus be identified by the controller 216 based on the configuration data 212, and provided to the packet router 128 by the packet processor 130. The packet router 128, in turn, provides the packets to the routing determination program 124. The packet router 128 communicates with the packet processor 130 as if the packet processor 130 were a traditional network interface card. The packet processor 130 invokes or calls an interface exposed by the packet router 128. The packet router 128 need have no knowledge that, and typically has no knowledge that, it is communicating with hardware that performs the packet processing operations performed by the packet processor 130.

The packet router 128 also receives packets from the routing determination program 124 that are to be sent to another router, as discussed above. The packet router 128 provides these packets to the hardware layer 122 by invoking or calling an interface exposed by the packet processor 130. This interface exposed by the packet processor 130 is an interface expected by the packet router 128 to be exposed by a network interface card. The packet processor 130 receives these packets, and the controller 216 sends them to the identified router as an outgoing packet 222.

In one or more embodiments, the routing determination program 124 also communicates with the packet router 128 requesting various status information. Various status information can be requested, such as packet count (a number of packets received or sent over some time period). The call monitoring program 126 monitors such communications, and in response to a request for status information, obtains the requested status information from the packet processor 130 and returns the requested status information to the routing determination program 124. The call monitoring program 126 itself obtains the status information from the packet processor 130, or alternatively the call monitoring program 126 communicates a request to the hardware configuration program 210 to obtain the status information from the packet processor 130. The status information is obtained by requesting the status information from the packet processor 130 (e.g., a request communicated to the controller 216), or alternatively by performing a read of the proper memory location (e.g., by performing a register read) of the memory 214 where the status information is stored.

The obtained status information is returned to the routing determination program 124 by the call monitoring program 126. Thus, the routing determination program 124 receives status information from the packet processor 130 via the call monitoring program 126, without having knowledge that the packet processor 130 is performing the packet processing operations rather than the packet router 128. It should be noted that care can be taken so that the routing determination program 124 receives a response to the status information request from the call monitoring program 126 rather than from both the call monitoring program 126 and the packet router 128. In one or more embodiments, an entity (such as a NetDev module) represents network devices to various programs or modules of the router 106, and a NetDev module is included in the router 106 (e.g., as part of a driver in the kernel space 204). The NetDev module receives status information from one or both of the packet router 128 and the packet processor 130, and provides a single response (e.g., the status information received from the packet processor 130) to the call monitoring program 126. The NetDev module can drop or otherwise ignore the other received status information (e.g., from the packet router 128), so the routing determination program 124 receives a response to the status information request from the call monitoring program but not the packet router 128.

Figure 3:
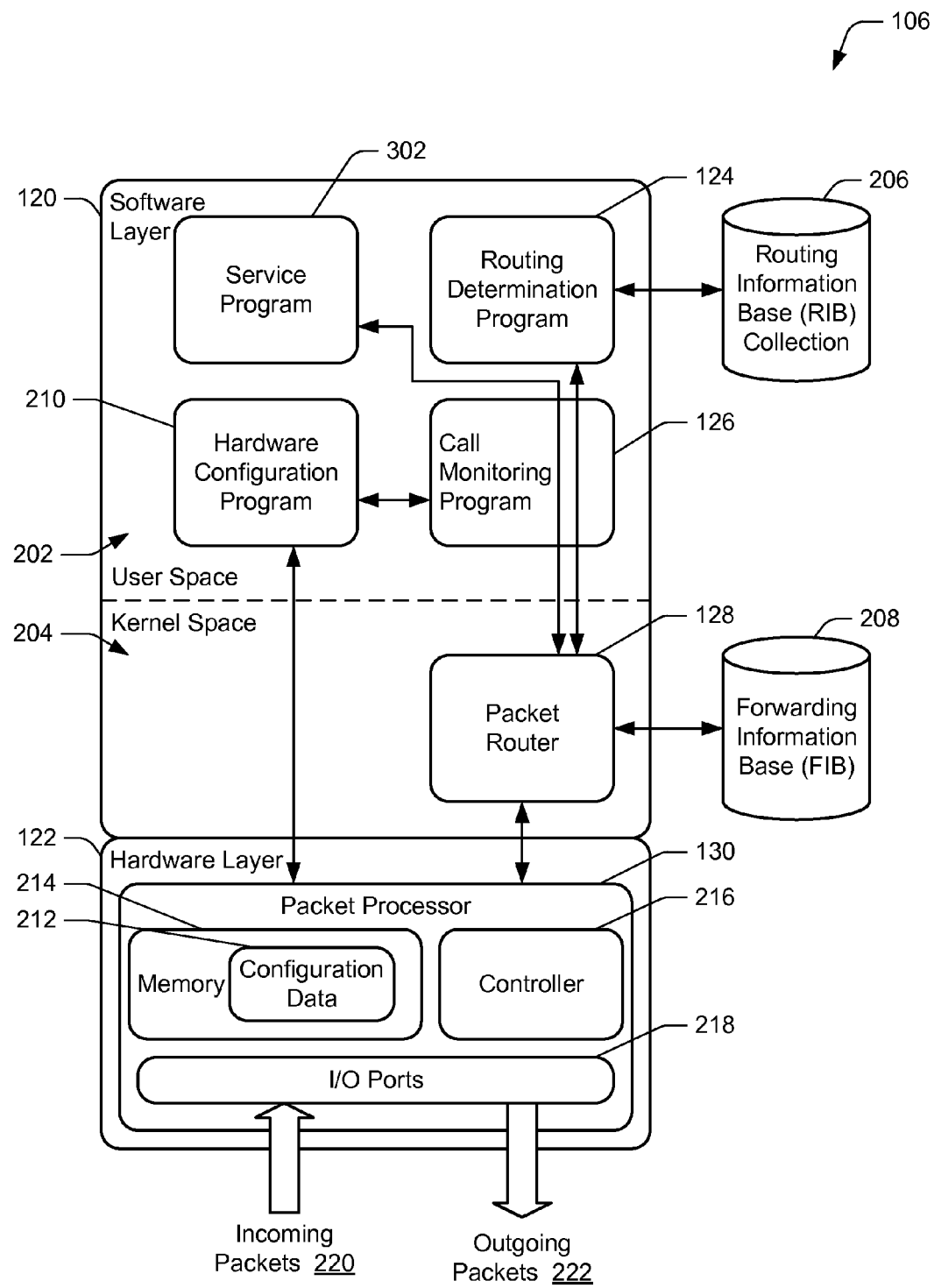
FIG. 3 illustrates another router in additional detail in accordance with one or more embodiments.

FIG. 3 illustrates the router 106 in additional detail in accordance with one or more embodiments. The router 106 includes the software layer 120, the hardware layer 122, the RIB collection 206, and the FIB 208 as discussed above. However, in the example of FIG. 3 the router 106 also includes a service program 302. The service program 302 provides various services or functionality to other devices or to the router 106, such as Web page hosting services, communications services (e.g., email or text messaging), additional path determination or other packet routing functionality, and so forth. The service program 302 optionally communicates with the packet router 128, providing configuration data identifying packets that are to be provided to the service program 302, such as packets of particular types, packets having particular target destinations, and so forth. The service program 302 also optionally provides configuration data to the packet router 128 identifying how particular types of packets are to be handled by the packet router 128 (e.g., how the packet router 128 is to determine where to send the packets or otherwise how to handle the packets).

The call monitoring program 126 also monitors or snoops communications between the service program 302 and the packet router 128. The service program 302 uses calls, for example NetDev calls, to communicate the configuration data to the packet router 128. Any configuration data that can be communicated between the service program 302 and the packet router 128 can be monitored by the call monitoring program 126, which can have the configuration data reflected in the packet processor 130. The call monitoring program 126 has the configuration data reflected in the packet processor 130 in various manners, analogous to the reflection of configuration data from the routing determination program 124 in the packet processor 130 as discussed above.

Incoming packets 220 that are to be provided to the service program 302 can thus be identified by the controller 216 based on the configuration data 212, and provided to the packet router 128 by the packet processor 130. The packet router 128, in turn, provides the packets to the service program 302. Additionally, incoming packets 220 that are to be handled in a particular manner as indicated by the configuration data from the service program 302 can thus be identified by the controller 216 based on the configuration data 212, and handled as indicated by the configuration data 212.

The packet router 128 can also receive packets from the service program 302 that are to be sent to another router or device. The packet router 128 provides these packets to the hardware layer 122 by invoking or calling an interface exposed by the packet processor 130. This interface exposed by the packet processor 130 is an interface expected by the packet router 128 to be exposed by a network interface card. The packet processor 130 receives these packets, and the controller 216 sends them to the identified router or device as an outgoing packet 222.

Thus, as can be seen from the discussion herein, configuration data communicated to the packet router 128 is monitored by the 126, which has the configuration data reflected in the packet processor 130. The configuration data is any configuration data indicating to the packet router 128 how to handle particular types of packets, rules or criteria to apply in handling packets, and so forth.

Figure 4:
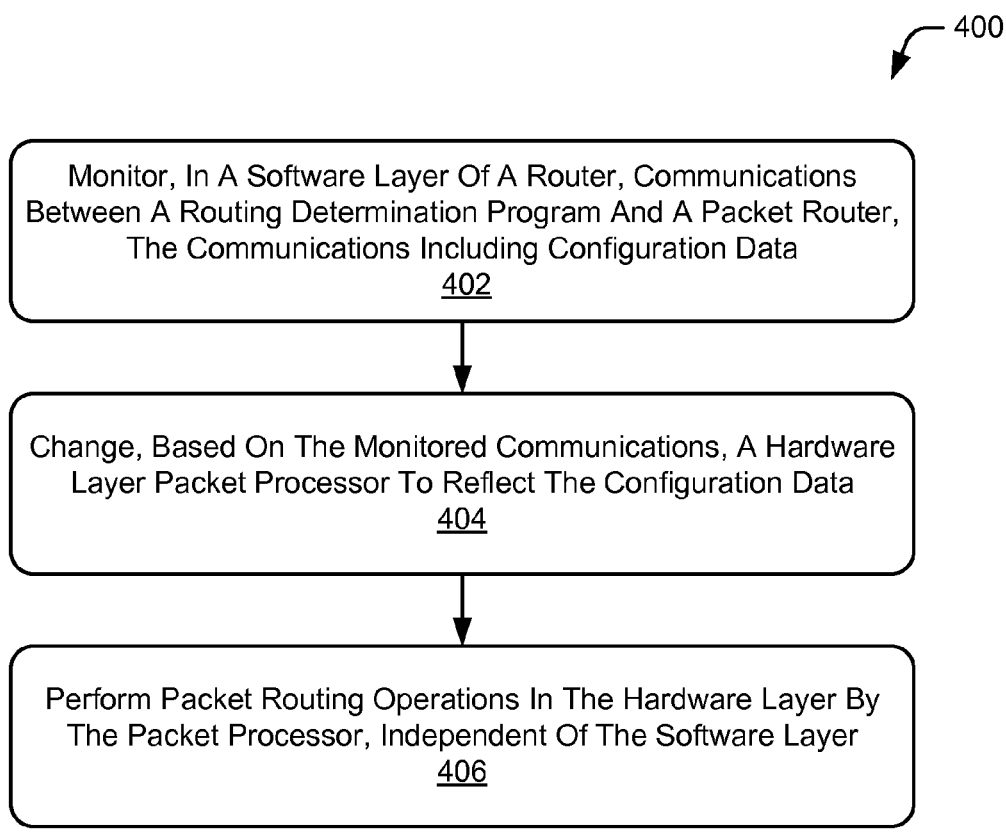
FIG. 4 is a flowchart illustrating an example process for hardware acceleration for routing programs in accordance with one or more embodiments.

FIG. 4 is a flowchart illustrating an example process 400 for hardware acceleration for routing programs in accordance with one or more embodiments. Process 400 is described in the form of a set of blocks that specify operations to be performed, and the operations are not necessarily limited to the order shown. The operations performed by the set of blocks in process 400 are performed by a router, such as the router 106 of FIG. 1, FIG. 2, or FIG. 3.

At block 402, communications between a routing determination program and a packet router are monitored. Both the routing determination program and the packet router are implemented in a software layer of a router. The communications include configuration data being provided by the routing determination program to the packet router, such as an FIB as discussed above.

At block 404, a packet processor implemented in a hardware layer of the router is changed, based on the monitored communications, to reflect the configuration data. The configuration data is reflected in the packet processor by being written in memory of the packet processor as discussed above.

At block 406, packet routing operations are performed in the hardware layer by the packet processor. The packet routing operations include receiving packets, determining the next routers in the paths to the target destinations of the packets, and sending the packets to the next routers as discussed above. These packet routing operations are performed in the hardware layer, independent of the software layer.

The techniques discussed herein support various usage scenarios. Routers using existing routing determination programs and packet routers can be used with the techniques discussed herein without alteration—no changes need be made to accommodate the packet processor. Neither the routing determination program nor the packet router need be customized to operate with the packet processor, yet can be readily changed as desired by a user of the router without interfering with the techniques discussed herein. The techniques discussed herein provide a low-cost solution to having the packet routing operations of receiving packets, determining the next routers in the paths to the target destinations of the packets, and sending the packets to the next routers independent of the software layer performed in hardware (and thus faster than if performed in software), without having customized software programs or hardware packet processors. Performing the packet routing operations in hardware also frees the CPU of the router to perform other operations, rather than being heavily occupied with performing the packet routing operations.

Figure 5:
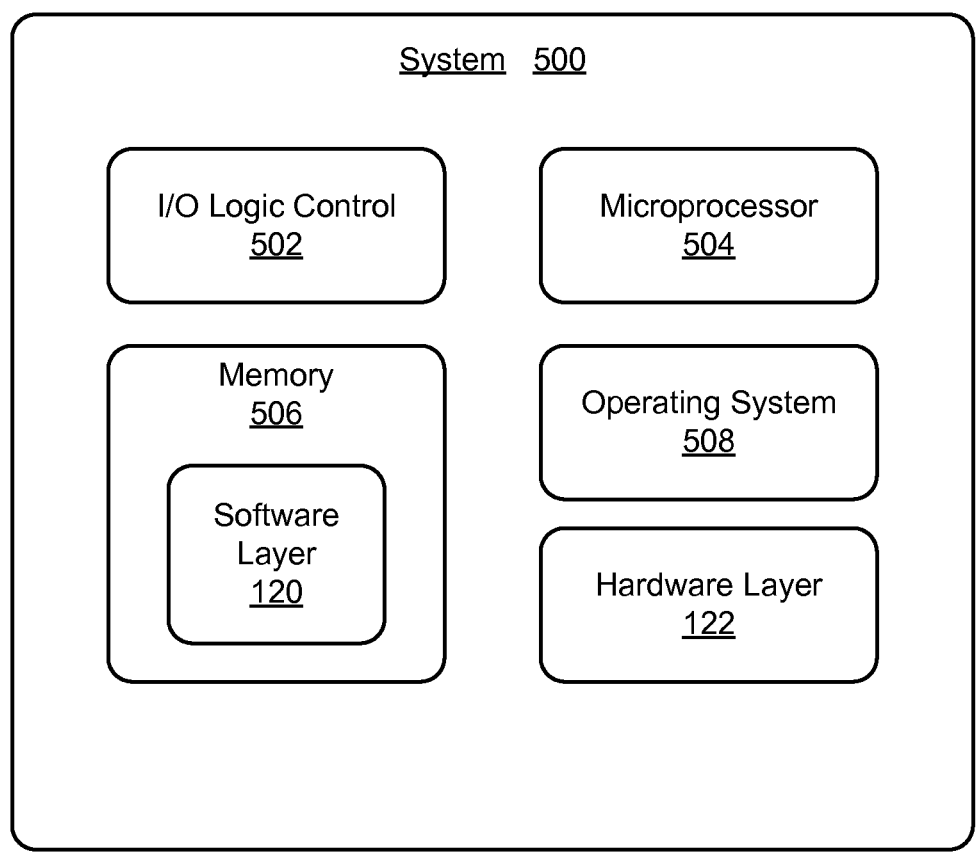
FIG. 5 illustrates an example system that can implement various aspects of the techniques described herein.

FIG. 5 illustrates an example system 500 that can implement various aspects of the techniques described herein. System 500 can be implemented in a variety of different devices, such as one or a combination of a media device, computer device, television set-top box, video processing and/or rendering device, Ethernet interface, switch, appliance device, gaming device, electronic device, vehicle, workstation, smart phone, tablet, and/or in any other type of computing device. System 500 can be implemented as a System-on-Chip (SoC).

System 500 can include electronic circuitry, a microprocessor, memory, input-output (I/O) logic control, communication interfaces and components, other hardware, firmware, and/or software needed to run a device. System 500 can also include an integrated data bus (not shown) that couples the various components of the system for data communication between the components. A wireless communication device that includes system 500 can also be implemented with many combinations of differing components.

In this example, system 500 includes various components such as an input-output (I/O) logic control 502 (e.g., to include electronic circuitry) and a microprocessor 504 (e.g., any of a microcontroller or digital signal processor). System 500 also includes a memory 506, which can be any type and/or combination of RAM, low-latency nonvolatile memory (e.g., Flash memory), ROM, one-time programmable memory, and/or other suitable electronic data storage. The memory 506 includes the software layer 120 of a router, which includes a routing determination program, call monitoring program, and packet router as discussed above. Alternately or additionally, system 500 may comprise a memory interface for accessing additional or expandable off-chip memory, such as an external Flash memory module. System 500 can also include various firmware and/or software, such as an operating system 508, which can be computer-executable instructions maintained by memory 506 and executed by microprocessor 504. System 500 may also include other various communication interfaces and components, communication components, other hardware, firmware, and/or software, and so forth.

System 500 also includes a hardware layer 122 of a router. The hardware layer 122 includes a multi-port packet processor that performs packet routing operations as discussed above.

One or more of the methods or techniques described above can take the form of a computer program product accessible from a computer-usable or computer-readable medium providing program code for use by or in connection with a computer or any instruction execution system. For the purposes of this description, a computer-usable or computer-readable medium can be any apparatus that can tangibly store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. However, computer-readable medium exclude signals, signal transmission, and carrier waves.

Further aspects of the present invention relates to one or more of the following clauses.

A method includes monitoring, in a router having a hardware layer and a software layer, communications between a routing determination program and a packet router. The routing determination program identifies one or more paths to each of multiple possible target destinations for packets in a network, and the packet router maintains a forwarding information base identifying selected ones of the one or more paths. The communications include the routing determination program providing to the packet router configuration data that identifies the selected ones of the one or more paths, and the routing determination program and the packet router are both part of the software layer of the router. The method also includes changing, based on the monitored communications, a packet processor to reflect the configuration data, the packet processor being part of the hardware layer of the router.

In the method, the configuration data comprises for each of the multiple possible target destinations, a selected one path to the target destination.

The method further includes, independent of the software layer of the router, receiving packets by the packet processor and also, for each received packet, identifying a next router based on both a target destination of the packet and the configuration data, and sending the packet to the next router.

In the method, the configuration data further identifies types of packets or target destinations of packets to be provided to the routing determination program by the packet processor.

The method further includes the packet processor providing a received packet to the routing determination program in response to the configuration data in the packet processor indicating the received packet is to be provided to the routing determination program.

The method further includes monitoring, in the router, additional communications that are between a service program and the packet router, the additional communications including the service program providing additional configuration data to the packet router, the service program being part of the software layer of the router. The method further includes changing, based on the monitored additional communications, the packet processor to reflect the additional configuration data.

The method further includes the packet processor providing a received packet to the service program in response to the additional configuration data in the packet processor indicating the received packet is to be provided to the service program.

In the method, the routing determination program is implemented in a user space of the software layer, and the packet router is implemented in a kernel space of the software layer.

In the method, the monitoring is performed by a call monitoring program implemented in the user space of the software layer.

In the method, the changing includes writing the configuration data to memory of the packet processor.

A router includes a packet processor implemented in a hardware layer of the router, and one or more programs implemented in a software layer of the router. The one or more programs are configured to monitor communications between a routing determination program and a packet router, the communications including the routing determination program providing configuration data to the packet router. The routing determination program and the packet router are both part of the software layer of the router. The one or more programs are further configured to change, based on the monitored communications, the packet processor to reflect the configuration data.

In the router, the configuration data includes one or more paths of a forwarding information base.

In the router, the packet processor is configured to, independent of the software layer of the router, receive packets and for each packet identify a next router based on both a target destination of the packet and the forwarding information base, and send the packet to the next router.

In the router, the configuration data includes identification of types of packets or target destinations of packets to be provided to the routing determination program by the packet processor.

In the router, the packet processor is configured to provide a received packet to the routing determination program in response to the configuration data in the packet processor indicating the received packet is to be provided to the routing determination program.

A computer-readable memory device includes computer-executable instructions that, when executed, implement a router to monitor, in the router, communications between a routing determination program and a packet router. The communications include the routing determination program providing configuration data to the packet router, the routing determination program and the packet router both being part of a software layer of the router. The router is also to change, based on the monitored communications, a packet processor to reflect the configuration data, the packet processor being part of a hardware layer of the router.

For the computer-readable memory device, the configuration data includes one or more paths of a forwarding information base.

For the computer-readable memory device, the router is further to, independent of the software layer of the router, receive packets by the packet processor and also, for each received packet, identify a next router based on both a target destination of the packet and the forwarding information base, and send the packet to the next router.

For the computer-readable memory device, the configuration data includes identification of types of packets or target destinations of packets to be provided to the routing determination program by the packet processor.

For the computer-readable memory device, the router is further to monitor, in the router, additional communications that are between a service program and the packet router. The additional communications include the service program providing additional configuration data to the packet router, the service program being part of the software layer of the router. The router is also to change, based on the monitored additional communications, the packet processor to reflect the additional configuration data.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:

monitoring, by a call-monitoring program in a router having a hardware layer and a software layer, communications between a routing determination program and a packet router, the routing determination program identifying one or more paths to each of multiple possible target destinations for packets in a network, the packet router being implemented in a kernel space of the software layer and configured to maintain a forwarding information base identifying selected ones of the one or more paths, the communications including the routing determination program providing first configuration data to the packet router that identifies the selected ones of the one or more paths, the routing determination program and the packet router both being part of the software layer of the router, the routing determination program and the packet router configured to communicate with the hardware layer of the router via a first communication channel;

sending, by the call-monitoring program, the monitored communications to a hardware configuration program, the hardware configuration program configured to:

communicate with a hardware switch via a second communication channel, the hardware switch being part of the hardware layer of the router;

translate the monitored communications into a format compatible with the hardware switch; and change, based on the monitored communications, second configuration data stored in a memory of a packet processor to reflect the first configuration data communicated to the packet router, the packet processor being part of the hardware switch.

2. The method of claim 1, the first and second configuration data comprising, for each of the multiple possible target destinations, a selected one path to the target destination.

3. The method of claim 2, further comprising, independent of the software layer of the router:
receiving packets by the packet processor; and
for each received packet,
identifying a next router based on both a target destination of the packet and the second configuration data, and
sending the packet to the next router.

4. The method of claim 1, the first and second configuration data further identifying types of packets or target destinations of packets to be provided to the routing determination program by the packet processor.

5. The method of claim 4, further comprising the packet processor providing a received packet to the routing determination program in response to the second configuration data in the packet processor indicating the received packet is to be provided to the routing determination program.

6. The method of claim 1, further comprising:
monitoring, by the call-monitoring program in the router, additional communications that are between a service program and the packet router, the additional communications including the service program providing additional configuration data to the packet router, the service program being part of the software layer of the router; and
sending, by the call-monitoring program, the monitored additional communications to the hardware configuration program, the hardware configuration program further configured to change, based on the monitored additional communications, the second configuration data stored in the memory of the packet processor to reflect the additional configuration data.

7. The method of claim 6, further comprising the packet processor providing a received packet to the service program in response to the additional configuration data reflected in the second configuration data stored in the memory of the packet processor indicating the received packet is to be provided to the service program.

8. The method of claim 1, the hardware configuration program further configured to communicate with the hardware switch via a device driver, the device driver configured to change the second configuration data stored in the memory of the packet processor.

9. The method of claim 1, the packet router further configured to communicate with the packet processor, the communications among the routing determination program, the packet router, and the packet processor comprising a separate communication channel from the second communication channel consisting of communications among the call-monitoring program, the hardware configuration program, and the packet processor.

10. The method of claim 1, wherein the communications comprise native, open-source Linux code.

11. The method of claim 1, wherein the format compatible with the hardware switch is vendor proprietary.

12. A router comprising:
a packet processor implemented in a hardware layer of the router;
one or more programs implemented in a software layer of the router, the one or more programs including a call-monitoring program and a hardware configuration program:
the call-monitoring program configured to:
monitor communications between a routing determination program and a packet router, the communications including the routing determination program providing first configuration data to the packet router, the routing determination program and the packet router both being part of the software layer of the router, the routing determination program being implemented in a user space of the software layer and the packet router being implemented in a kernel space of the software layer, the routing determination program and the packet router configured to communicate with the hardware layer of the router via a first communication channel;
send the monitored communications to the hardware configuration program; and
the hardware configuration program configured to:
communicate with the hardware layer via a second communication channel;
translate the monitored communications into a format compatible with the packet processor; and
change, based on the monitored communications, second configuration data stored in a memory of the packet processor to reflect the first configuration data provided to the packet router.

13. The router of claim 12, the first and second configuration data comprising one or more paths of a forwarding information base.

14. The router of claim 13, the packet processor being configured to, independent of the software layer of the router:
receive packets; and
for each received packet,
identify a next router based on both a target destination of the packet and the forwarding information base, and
send the packet to the next router.

15. The router of claim 12, the first and second configuration data comprising identification of types of packets or target destinations of packets to be provided to the routing determination program by the packet processor.

16. The router of claim 15, the packet processor being configured to provide a received packet to the routing determination program in response to the second configuration data in the packet processor indicating the received packet is to be provided to the routing determination program.

17. A computer-readable memory device comprising computer-executable instructions that, when executed, implement a router to:
monitor, by a call-monitoring program in the router, communications between a routing determination program and a packet router, the communications including the routing determination program providing first configuration data to the packet router, the routing determination program and the packet router both being part of a software layer of the router, the routing determination program being implemented in a user space of the software layer and the packet router being implemented in a kernel space of the software layer, the routing determination program and the packet router configured to communicate with a hardware layer of the router via a first communication channel;
send, by the call-monitoring program in the router, the monitored communications to a hardware configuration program in the router;

communicate, by the hardware configuration program in the router, via a second communication channel with the hardware layer;

translate, by the hardware configuration program in the router, the monitored communications into a format compatible with a packet processor, the packet processor being part of the hardware layer of the router; and change, by the hardware configuration program in the router, based on the monitored communications, and through register writes, second configuration data stored in a memory of the packet processor to reflect the first configuration data communicated to the packet router.

18. The computer-readable memory device of claim 17, the first and second configuration data comprising one or more paths of a forwarding information base.

19. The computer-readable memory device of claim 18, the router being further configured to, independent of the software layer of the router:

receive packets by the packet processor; and for each received packet, identify a next router based on both a target destination of the packet and the forwarding information base, and send the packet to the next router.

20. The computer-readable memory device of claim 17, the router being further configured to:

monitor, by the call-monitoring program in the router, additional communications that are between a service program and the packet router, the additional communications including the service program providing additional configuration data to the packet router, the service program being part of the software layer of the router; and change, by the hardware configuration program in the router and based on the monitored additional communications, the second configuration data stored in the memory of the packet processor to reflect the additional configuration data communicated to the packet router.

* * * * *